July 9, 1968  Y. T. SAILORS  3,391,662
PORTABLE INCINERATOR
Filed Feb. 16, 1967

INVENTOR.
YOUNG T. SAILORS
BY
ATTORNEYS

United States Patent Office 3,391,662
Patented July 9, 1968

3,391,662
PORTABLE INCINERATOR
Young T. Sailers, C–15 Atlanta Road,
Gainesville, Ga. 30501
Filed Feb. 16, 1967, Ser. No. 616,611
8 Claims. (Cl. 110—18)

ABSTRACT OF THE DISCLOSURE

The invention disclosed herein is directed to a portable incinerator for use with a lawn mower which is effective to burn green, freshly cut material cut by the lawn mower. The incinerator includes a plurality of burner nozzles positioned above the discharge of the material into the incinerator and a plurality of burner nozzles positioned below the discharge of the material.

Disclosure

This invention relates generally to incinerators for burning leaves and the like, and is more particularly related to a portable incinerator for use with a lawn mower to burn the leaves, grass and other material cut and picked up by a lawn mower.

While portable incinerators have been constructed in the past to pick up and burn dry leaves, grass and the like, these prior incinerators have not been adapted for use with lawn mowers to immediately burn the freshly cut leaves and grass. It is desirable to remove the freshly cut leaves or grass from the lawn or the like since failure to do so results in the cut grass and leaves shielding the growing grass thereunder to prevent the growth thereof.

Therefore, it is the principal object of the invention disclosed herein to provide an incinerator to be used in conjunction with a lawn mower for receiving the cut leaves and grass therefrom and subsequently burning these green, freshly cut leaves and grass to prevent this freshly cut material from retarding growth of the grass that would normally be under the shield formed by these cut leaves and grass.

The apparatus of the invention comprises generally a platform attached to a lawn mower and having an incinerator housing positioned thereon with burners carried therein which form a flame of large volume sufficient to burn the freshly cut leaves and grass as they are received through an appropriate connection between the lawn mower and the incinerator. A convenient gas supply is provided to the burners of the incinerator and is effective to generate sufficient heat to burn the green, freshly cut leaves and grass.

Figure 1:
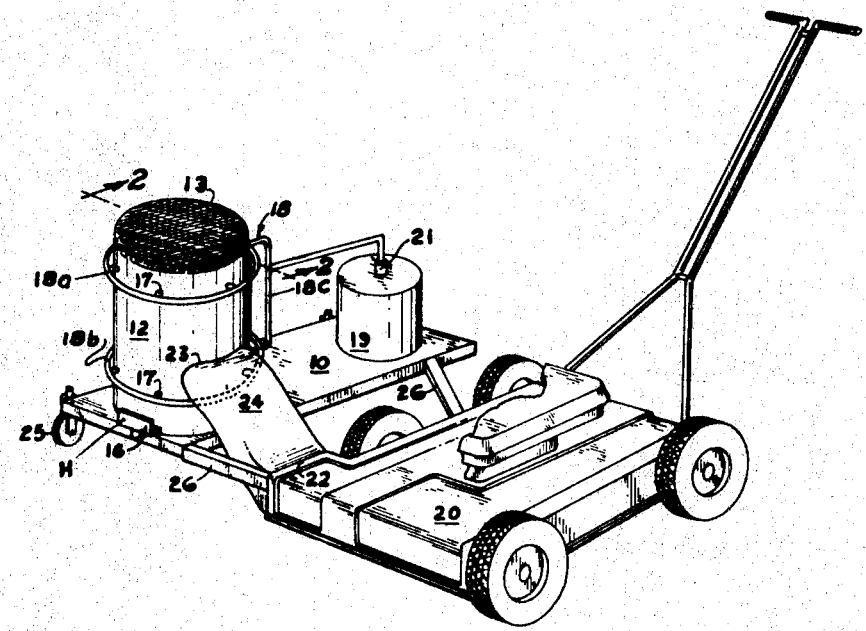
Figure 2:
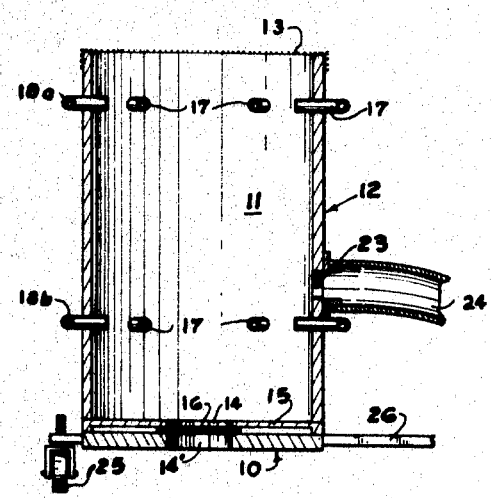

These and other objects, features and advantages of the invention will become more clearly understood upon consideration of the following specification taken in conjunction with the accompanying drawings wherein like characters of reference designate corresponding parts throughout, and in which:

FIG. 1 is a perspective view of the invention shown installed on a conventional lawn mower; and FIG. 2 is a cross-sectional view taken along the line 2—2 in FIG. 1.

These figures and the following detailed description disclose one specific embodiment of the invention, however, the inventive concept is not limited thereto since it may be embodied in other forms.

Referring more particularly to FIGS. 1 and 2, the invention will be seen to comprise generally a mounting platform 10 carrying thereon a cylindrical incinerator housing 12 defining a firebox 11 having a closed lower end and an open upper end. The open upper end is covered by a fire screen 13 to prevent ash from being carried out the top end of the firebox 11 by the rising hot gases of combustion within the firebox 11. The lower wall 15 of the incinerator housing 12 is provided with a sliding ash door 16 effective to uncover an ash discharge aperture 14 in the bottom wall of the housing 12 to discharge ashes from the lower end of the firebox 11 through the aperture 14 and an appropriate aperture 14' formed in the mounting platform 10. The ash door 16 is provided with an external handle H for selectively opening the door 16 to discharge the ashes from the firebox 11.

Positioned in a horizontal plane just below the top of the incinerator housing 12 are plurality of radially, inwardly extending burner nozzles 17 equally spaced around the circumference of the incinerator housing 12 and extending into the firebox 11 so as to direct gas fed therethrough in a horizontal plane toward the center of the firebox 11. Just upwardly of the bottom of the incinerator housing 12 is a second plurality of burner nozzles 17 spaced in like manner to the first plurality of burner nozzles 17 and effective to direct gas fed therethrough toward the center of the firebox 11.

A manifold 18 comprising a first manifold ring 18a, a second manifold ring 18b and a cross-over pipe 18c connects the burner nozzles 17 with the pressurized fuel supply 19 through a flow regulating valve 21 effective to control the flow of gas to the burner nozzles 17. The first manifold ring 18a communicates with each of the upper burner nozzles 17 and the second manifold ring 18b communicates with each of the lower burner nozzles 17. The cross-over pipe 18c communicates with the first and second manifold rings 18a and 18b as well as the fuel supply 19 through the valve 21. Therefore, it will be seen that when the upper and lower burner nozzles 17 direct a flow of gas toward the center of the firebox 11, and when this flow of gas is ignited, a large volume of flame is provided from just upwardly of the lower end of the firebox 11 to just below the upper end thereof.

A conduit 24 attached to the incinerator housing 12 around an entrance port 23 connects with the discharge opening 22 in a conventional lawn mower 20 and is effective to receive cut grass and leaves discharged from the lawn mower 20 through the discharge opening 22 in the side thereof. As the cut grass and leaves are forced through the aperture 23, they fall into the flame formed by the burner nozzles 17, are dried, and then ignited to be burned. If the hot gases rising from the combustion of the fuel forces the leaves or grass upwardly before they are completely burned, the fire screen 13 prevents the escape thereof so that they will be completely burned.

It is to be pointed out that the lawn mower 20 herein shown is of the rotary type, however, the invention may be used with other types of lawn mowers such as the reel-type lawn mower by incorporating minor changes in the configuration of the invention herein shown.

The invention herein shown has the platform 10 rigidly attached to the side of the lawn mower 20, as at 26, however, it may be desirable to place casters 25 on the outer edge of the platform 10, as seen in FIG. 2, so as to carry some of the weight or to attach the platform 10 to the mower 20 in another manner.

It is to be noted that various types of fuel, such as butane, propane, etc., may be supplied to the burner nozzles 17 through the manifold 18 from the tank 19. This fuel should be supplied under pressure to the burner nozzles 17 so that the flames therefrom will engulf substantially all of the area inside the firebox 12, thereby insuring complete, rapid and efficient combustion of the leaves or grass received therein.

Operation

As the lawn mower 20 is propelled over a lawn or the like by an operator or by some conventional power means, the platform 10 attached thereto is transported along with the mower. The lawn mower 20 will discharge leaves, cut grass, and other such material upward through the conduit 24 into the incinerator housing 12. As the leaves, cut grass and other material enter the incinerator housing 12, flames from the burner nozzles 17 will play upon the material and cause it to be consumed and reduced to ashes.

This residue of ashes falls to the bottom of the firebox 11 and can be discharged therefrom when the ash door 16 is opened. A portion of the necessary oxygen to support combustion is supplied to the incinerator housing 12 through the conduit 24 and the flow of air through the conduit 24 will aid the flow of leaves, cut grass and other material through the conduit 24. When the level of ashes or residue approaches the level of the lower burner nozzles 17, the operator removes the ashes or residue therefrom by opening the ash door 16.

Thus, it will be seen that the invention combines a plurality of previous operations into a single operation for accumulating leaves, cut grass and other material and subsequently burning this material so as to reduce the time and labor cost normally encountered in this operation. Further, it will be seen that the cut grass and leaves or the like will not be left on the lawn or the like to form a shield that retards the growth of the uncut growing grass thereunder. From the foregoing, it will be seen that the present invention provides a simple, rugged and endurable structure.

It will be understood by those skilled in the art that the present invention is not limited or confined to the specific structural details herein presented, thereby allowing numerous changes, modifications, and the full use of equivalents without departing from the sphere or scope thereof as defined in the appended claims.

What I claim as my invention is:

1. A portable incinerator combined with a lawn mower having a discharge through which grass, leaves and the like cut by the lawn mower are ejected comprising:
    (a) support means connected to said lawn mower;
    (b) an incinerator housing carried by said support means and defining a firebox therein;
    (c) conduit means connecting said discharge with said firebox to direct material ejected from said discharge into said firebox; and
    (d) burner means positioned in said firebox to simultaneously direct a flame into said firebox above the material ejected into said firebox and below said material ejected into said firebox.

2. The apparatus of claim 1 wherein said burner means comprises a plurality of radially extending burner nozzles extending inwardly through said incinerator housing, said nozzles being equally spaced around the periphery of said housing above said material being ejected into said firebox and below said material being ejected into said firebox.

3. The apparatus of claim 2 wherein said burner means further comprises:
    (a) fuel supply means; and
    (b) manifold means connecting said burner nozzles to said fuel supply means to supply fuel to said nozzles.

4. The apparatus of claim 3 wherein said fuel supply includes flow regulation means for regulating the flow of fuel to said burner nozzles.

5. The apparatus of claim 4 wherein said manifold means includes:
    (a) a first manifold ring concentric with said incinerator housing and connected to said burner nozzles above said material being ejected into said firebox;
    (b) a second manifold ring concentric with said manifold housing and connected to said burner nozzles below said material being ejected into said firebox; and
    (c) a cross-over pipe connecting said first and second manifold ring and communicating with said fuel supply means.

6. The apparatus of claim 5 wherein said support means is fixedly attached to said lawn mower.

7. The apparatus of claim 5 wherein said support means includes caster means effective to carry said support means.

8. In combination, a lawn mower having a discharge through which grass, leaves and the like are cut by said lawn mower and are ejected and an incinerator effective to receive said grass, leaves and the like from said lawn mower, said incinerator comprising:
    (a) support means connected to said lawn mower;
    (b) an incinerator housing carried by said support means and defining a firebox therein;
    (c) conduit means connecting said discharge with said firebox to direct material ejected from said discharge into said firebox; and
    (d) burner means positioned in said firebox to direct a flame into said firebox above the material ejected into said firebox and below said material ejected into said firebox.

References Cited

UNITED STATES PATENTS

| | | |
|---|---|---|
| 1,776,914 | 9/1930 | Langford. |
| 2,700,863 | 2/1955 | Etem. |
| 2,905,963 | 9/1959 | Boyer. |
| 3,026,551 | 3/1962 | Smith _____ 110—19 X |

JAMES W. WESTHAVER, *Primary Examiner.*